United States Patent Office 3,778,368
Patented Dec. 11, 1973

3,778,368
DISPOSAL OF METAL-CONTAINING
WASTE WATER
Yoshiro Nakamura, Morioka, Akira Umehara, Osaka, and Itsuyo Yamada, Kobe, Japan, assignors to Sankyo Kasei Company, Limited, Osaka-shi, Japan
No Drawing. Filed Aug. 14, 1972, Ser. No. 280,352
Claims priority, application Japan, Aug. 18, 1971, 46/63,156
Int. Cl. C02b 1/26; C02c 5/02
U.S. Cl. 210—54                                   6 Claims

ABSTRACT OF THE DISCLOSURE

In treating waste water containing at least one of metal ions having a normal electrode potential of at least —0.440 v. (at 25° C.) to remove the metal ion therefrom, a method which is characterized in that to the waste water is added at least one of mercapto-s-triazines and water-soluble salts thereof.

This invention relates to disposal of waste water, more particularly to a new and useful method for treating waste water containing harmful metals therein.

With the rapid growth of industries in recent years various industrial wastes containing harmful metals are produced in large amounts, and the disposal thereof has been an important problem for protecting our environment from pollution with the harmful metals. For such purpose various methods for removing a harmful metal from the waste have been proposed and practiced. Typical methods are (1) a neutralizing method in which the waste containing a metal ion is neutralized with an alkali to precipitate the metal in the form of metal hydroxide, (2) a hydrogen sulfide method in which hydrogen sulfide is injected into the waste to precipitate the metal in the form of metal sulfide, and (3) an adsorption method in which the waste is passed through a layer of an ion-exchange resin or active carbon. Of these methods the adsorption method is not practical for the treatment of a large amount of various wastes from big industries, since such method requires a large apparatus and is only applicable to removal of a limited kind of metals. The hydrogen sulfide method has material drawbacks that the efficiency of removing harmful metal is low, particularly, in the case of a waste containing a metal ion in a relatively low concentration of less than 10 p.p.m. and that aluminum hydroxide, iron hydroxide and like coagulants have to be used to coagulate and precipitate the metal sulfide produced, resulting in the production of a large amount of precipitates with which difficulties are encountered in post-treatment. The precipitates, further, will allow the metal to be dissolved again in water when left to stand without post-treatment, resulting in secondary pollution.

Because of the above drawbacks of these methods, the neutralizing method has now been extensively conducted in the art. According to this method, however, a large amount of precipitate is also produced, which involves difficulties in post-treatment and will allow the metal to be dissolved again in water when left to stand without post-treatment. Furthermore, with a waste containing several kinds of metal ions to be removed, it is essential to adjust the pH of the waste to the value most proper to precipitate the hydroxide of each metal ion in question. This is a troublesome procedure. According to this method, moreover, the metal ion can never be removed beyond a certain limit even though the neutralization might be conducted at a pH most proper to precipitate hydroxide of the metal, since the metal hydroxide produced is more or less soluble in water and a metal ion contained in the waste in the form of a complex compound can not be precipitated as hydroxide.

Another method has also been proposed, in which aliphatic mercaptane is used for the reaction with harmful metal ions such as ions of Cu, Pb, Cd, etc. to produce water-insoluble mercaptide. However, the aliphatic mercaptane is so unstable as to be easily converted to other compounds having no reactivity with such metal ions when left to stand in the air. Further, such a method can not be satisfactorily practiced, since the efficiency of removing such metal ions from the waste is insufficient.

One object of the invention is accordingly to provide a method for treating waste water containing a harmful metal therein, whereby the above drawbacks of the conventional methods can be eliminated.

Another object of the invention is to provide a method for removing a harmful metal from waste water effectively with a simple procedure.

Another object of the invention is to provide a method for removing a harmful metal from waste water with a high efficiency in conformity with the recent strict regulations on the discharge of waste.

Another object of the invention is to provide a method for treating waste water containing a harmful metal therein, which can effectively be conducted in a wide range of pH varying from acidity to alkalinity.

Another object of the invention is to provide a method for treating waste water containing a harmful metal therein, in which the sludge produced can be easily filtrated to give a mass having a small water content of less than 80 weight percent and capable of being subjected to incineration as it is.

These and other objects and advantages of the invention will be apparent from the following description.

In treating waste water containing at least one of metal ions having a normal electrode potential of at least —0.440 v. (at 25° C.) to remove the metal ion therefrom, the present method is characterized in that to the waste water is added at least one of mercapto-s-triazines and water-soluble salts thereof, said mercapto-s-triazine having a formula of

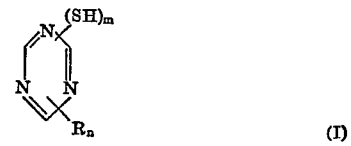

(I)

wherein R is hydrogen, —NH$_4$, —OH, alkyl having 1- to 8 carbon atoms, alkoxy having 1 to 8 carbon atoms, phenyl, cyclohexyl, oxazinyl, phenoxy, —NR'$_2$ or SR", R' being hydrogen, alkyl having 1 to 8 carbon atoms, phenyl, cyclohexyl, naphthyl or benzyl, R" being alkyl having 1 to 8 carbon atoms, phenyl, cyclohexyl, naphthyl or benzyl; $m$ is an integer of 1 to 3 and $n$ is 0 or an integer of 1 to 2.

According to the researches of the present inventors it has been found that when the above mercapto-s-triazine or water-soluble salt thereof is added to a waste water containing a metal ion having a normal electrode potential of at least —0.440 v. (at 25° C.), the metal ion can be removed from the waste with high efficiency and with a simple procedure. In fact, the metal ion can be effectively removed according to the present invention with efficiency as high as several ten times that attained by the conventional neutralizing method. By the treatment of the present invention the metal content in the waste is reduced to substantially negligible amount of less than 0.1 p.p.m. by weight, whereby the waste thus treated can be discharged without pollution with the metal. Further, the present treatment can effectively be conducted in a wide pH range, so that the waste can be subjected to the present treatment as it is without any preliminary treatment. The sludges produced by the present invention, moreover, never allow the metal contained therein to be dissolved in water again and are easily subjected to post-treatment.

The waste water to be treated in accordance with the present invention includes various industrial wastes containing at least one of metal ions having a normal electrode potential of at least $-0.440$ v. (at $25°$ C.). Such metal ions are, for example, $Fe^{++}$, $Cd^{++}$, $Ni^{++}$, $Sn^{++}$, $Pb^{++}$, $Fe^{+++}$, $Cu^{++}$, $Hg^{++}$, $Ag^+$, etc. Since the present method is applicable in a wide pH range, the waste can be subjected to the present treatment without any pH adjustment. The present method is effective even on the metal ion dissolved in the waste in a small amount and in the form of chelate salt, which has never been removed by the conventional methods, e.g., neutralizing method. Thus the present method can also be applied to the waste which has been treated by the conventional methods but still contains a considerable amount of remaining metal ion.

The s-triazine derivatives to be used in the invention are a mercapto-s-triazine represented by the Formula I disclosed before and a water-soluble salt thereof, such as, an alkali metal salt, ammonium salt and alkaline earth metal salt. The mercapto-s-triazine includes a monomercapto-s-triazine, dimercapto-s-triazine and trimercapto-s-triazine. Of these are preferable di- and tri-mercapto-s-triazines and water-soluble salts thereof. These compounds are stable and undergo no change when left to stand in the air for a long period of time. It is not required for the s-triazine derivatives to have a high solubility in water, provided that they will be dissolved in water in a minimum amount necessary for adsorbing metal ions in the water. The mono-, di- and tri-mercapto-s-triazines and the alkali metal, ammonium and alkaline earth metal salts thereof are usually dissolved in water in a concentration of 0.01 to 25 wt. percent at $25°$ C., which is sufficient for the purpose.

Examples of the s-triazine derivatives are as follows:

(A) Monomercapto-s-triazines and water-soluble salts thereof:

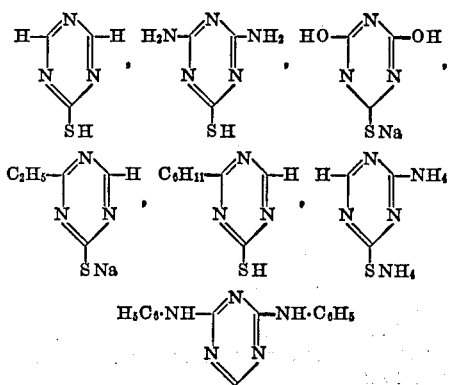

(B) Dimercapto-s-triazines and water-soluble salts thereof:

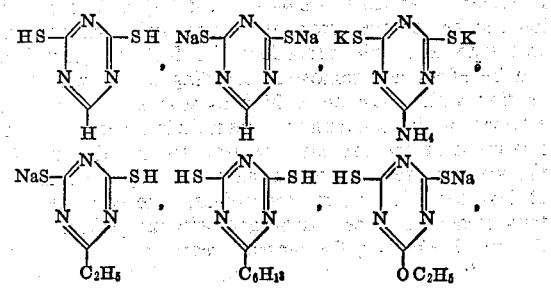

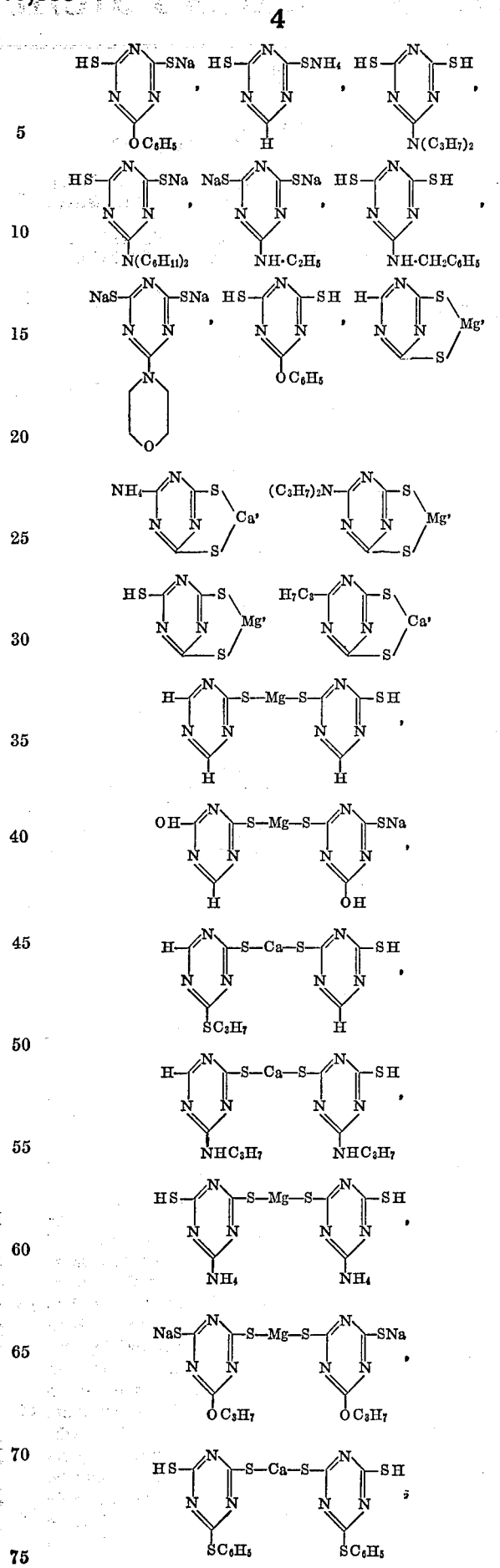

(C) Trimercapto-s-triazines and water-soluble salts thereof:

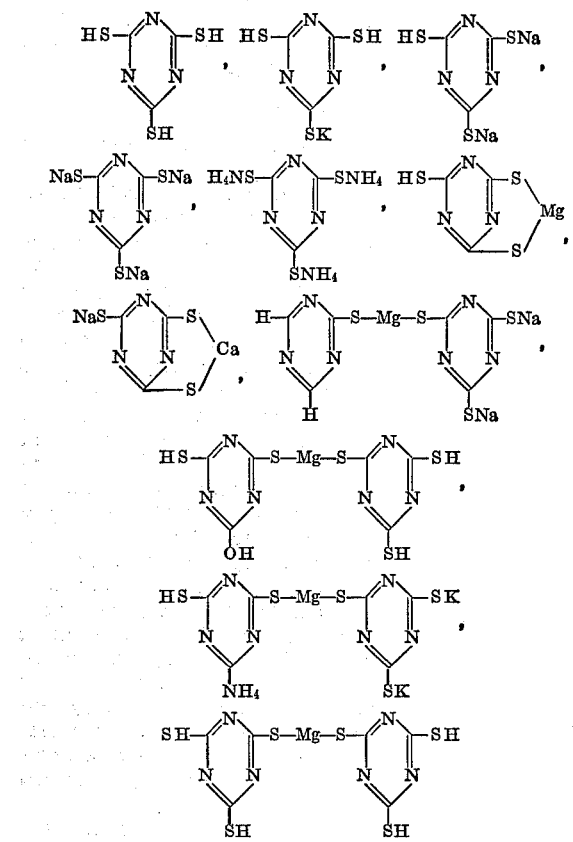

The amount of s-triazine derivatives to be used in the invention can vary over a wide range in accordance with the kinds of metal ions to be removed and triazine derivatives to be used. The triazine derivatives may usually be added to the waste water in such an amount as to provide at least one mercapto group per valence of the metal ion. Excess amount of the s-triazine derivatives can be used without any adverse effect, since the compounds have substantially no toxicity nor harmful effects on human being as well as on animals and plants. However, a largely excessive amount thereof gives no improved effect, so that it is preferable to use the compound in an amount less than 10 moles per valence of the metal ions. Particularly preferable amount is in the range of 1 to 3 moles per valence of the metal ions.

The s-triazine derivatives used in the invention can be applied in a wide pH range to display excellent adsorption effect on metal ions having a normal electrode potential of at least −0.440 v. (at 25° C.). In fact, the method of the invention can be practiced at a pH of 2 to 12, whereby the metal ions contained in the waste are adsorbed to the s-triazine derivatives to produce water-insoluble precipitate and effectively removed from the waste with a high efficiency. Therefore, there is no need, according to the method of the invention, to adjust the pH of the waste before the treatment of the present invention, because wastes from various industries are usually in the above pH range. Thus the present method can be applied to various industrial wastes without any preliminary treatment.

The treatment of the invention can be satisfactorily carried out by adding with stirring at least one of the s-triazine derivatives specified before to the waste to be treated. The resultant mixture is then left to stand for precipitation and the precipitate is, as in the conventional neutralizing method, filtered out by a suitable filtering means. The precipitate thus filtered out usually contains only about 50 to 80 wt. percent of water, which is far low as compared with the precipitate obtained according to the conventional neutralizing method in which it is difficult to reduce the water content to less than 95 weight percent. Therefore, the precipitate obtained in the present invention can be easily burned to ashes or discarded into cavity in the ground as it is. The filtrate is discharged as it is or after being neutralized.

For a better understanding of the invention examples are given below, in which p.p.m., p.p.b. and percent are all by weight and metal ion concentration was determined by atomic absorption analysis disclosed in JIS 0102–1971.

EXAMPLE 1

To four kinds of 200 ml. of waste water samples containing different metal ions was added monosodium salt of 2,4,6-trimercapto-s-triazine trihydrate

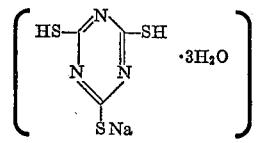

and each sample was stirred for 15 minutes. The samples thus treated were filtered with suction and the concentration of metal ions in the filtrates and the amount of the precipitates were determined. The results are shown in Table 1.

For comparison in Table 1 are also shown the results according to the conventional neutralizing method in which the same waste water samples were respectively adjusted to pH 7.5 with a 10% aqueous solution of sodium hydroxide and then filtered in the same manner.

TABLE 1

| | Sample No. | Kind of metal ion | Metal ion concentration (p.p.m.) | pH | Amount of triazine comp. added (g.) | Metal ion concentration in filtrate (p.p.m.) | Amount of precipitate (g.) |
|---|---|---|---|---|---|---|---|
| Process according to the present invention | 1 | Cu++ | 495 | 4 | 0.68 | <0.03 | 1.6 |
| | 2 | Cd++ | 480 | 5 | 0.39 | <0.02 | 1.3 |
| | 3 | Pb++ | 480 | 2 | 0.20 | <0.1 | 0.6 |
| | 4 | Hg++ | 1,960 | 2 | 0.80 | <0.001 | 3.6 |
| Process according to the conventional neutralizing method | 1' | Cu++ | 495 | 4 | | 1.9 | 3.0 |
| | 2' | Cd++ | 480 | 5 | | 1.3 | 2.5 |
| | 3' | Pb++ | 480 | 2 | | 6.1 | 2.2 |
| | 4' | Hg++ | 1,960 | 2 | | 0.1 | 9.2 |

From Table 1 above, it is evident that the method according to the present invention displays excellent effect in removing metal ion from the waste water, giving only a small amount of the precipitate.

The precipitates formed in Example 1 were added to water and to aqueous solutions of various acids and left to stand for 3 days, to determine stability of the precipitates by measuring metal ions dissolved in the water and the acid solutions. The results are given in Table 2.

TABLE 2

| Precipitate No.* | Water (p.p.m.) | 2% aqueous solution of citric acid | Aqueous solution of nitric acid (pH 2) | Aqueous solution of sulphuric acid (pH 1.5) |
|---|---|---|---|---|
| 1 | None | None | None | None. |
| 2 | do | do | do | Do. |
| 3 | do | do | do | Do. |
| 4 | do | do | Trace | Do. |
| 1' | 2.9 | | | |
| 2' | 1.8 | | | |
| 3' | 7.1 | | | |
| 4' | Trace | | | |

*The reference number given in Table 2 represents a precipitate obtained from the waste sample referred to by the same number.

From Table 2 above, it is apparent that the precipitates formed according to the present invention are very stable and will not release metal ions.

EXAMPLE 2

To 200 ml. of a waste fixing solution of pH 8 containing 500 p.p.m. of Ag+ was added 0.1 g. of monosodium salt of 2,4,6-trimercapto-s-triazine hydrate

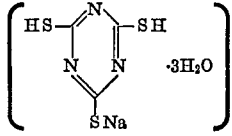

and after being stirred for 15 minutes, the waste water was filtered. The concentration of Ag+ in the filtrate was less than 0.02 p.p.m.

EXAMPLE 3

To 200 ml. of a waste water samples of pH 4 containing 500 p.p.m. of Cd++ were respectively added 0.5 g. of monosodium salts of 4,6-dimercapto-s-triazines represented by the formula of

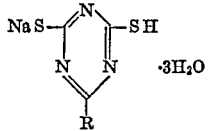

After being stirred for 15 minutes, each sample was filtered. The concentration of Cd++ in each filtrate is shown in Table 3 below.

TABLE 3

NaS—[triazine]—SH·3H₂O

| —R | Metal ion concentration in filtrate (p.p.m.) |
|---|---|
| —C₂H₅ | <0.05 |
| —C₃H₇ | <0.05 |
| —C₄H₉ | <0.05 |
| —C₅H₁₁ | <0.05 |
| —SC₃H₇ | <0.05 |
| —SC₄H₉ | <0.05 |
| —N(C₃H₇)₂ | <0.05 |
| —N(C₄H₉)₂ | <0.05 |
| —N(C₅H₁₁)₂ | <0.05 |
| —NHC₅H₁₁ | <0.05 |
| —NHC₆H₅ | <0.05 |
| —N○ (morpholino) | <0.05 |
| | <0.05 |

EXAMPLE 4

To 400 ml. of waste water sample of pH 4.8 containing 21 p.p.m. of Cd++ was added 3 ml. of a 3% aqueous solution of monosodium salt of 2,4,6-trimercapto-s-triazine

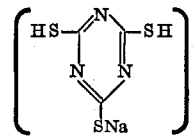

and after being stirred for 15 minutes and left to stand for 30 minutes in a 500 ml. messcylinder, the concentration in the supernatant was measured with the result of 0.02 p.p.m. of Cd++.

EXAMPLE 5

To 500 ml. of waste water of pH 8.6 which was discharged from an electroplating plant and contained Cu₂P₂O₇ (78.5 p.p.m. as Cu++) was added 6 ml. of 3% aqueous solution of monosodium salt of 2,4,6-trimercapto-s-triazine

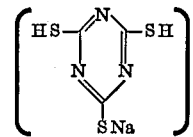

After the waste water was stirred for 15 minutes and left to stand for 30 minutes, reddish brown flocks were precipitated. The concentration of Cu++ in the supernatant was less than 0.03 p.p.m.

EXAMPLE 6

To 500 ml. of a waste water sample of pH 5 containing sodium salt of ethylmercurithiosalicylic acid (62 p.p.m. as Hg++) was added 60 mg. of monosodium salt of 2,4,6-trimercapto-s-triazine hydrate

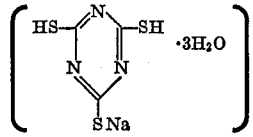

After being stirred for 15 minutes, the waste water was left to stand for 30 minutes. The concentration of Cu++ in the supernatant was less than 0.001 p.p.m.

EXAMPLE 7

To 1000 ml. of waste water of pH 5 which was discharged from a mercury process plant and contained 10.7 p.p.m. of total mercury (Hg++ and colloidal mercury) was added 2 g. of bleaching powder and the waste water was vigorously stirred to break the colloid. Then 0.1 g. of monosodium salt of 2,4,6-trimercapto-s-triazine hydrate

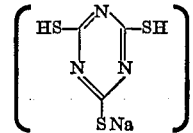

was added to the waste water and the waste water was stirred for 15 minutes and left to stand for 30 minutes. The concentration of Hg++ in the supernatant was only 1.9 p.p.b.

EXAMPLE 8

To 200 ml. of a waste water sample of pH 5.0 containing Pb(CH₃COO)₂ (149 p.p.m. as Pb++) was added 0.1 g. of magnesium salt of 2,4,6-trimercapto-s-triazine hydrate

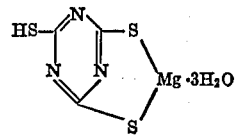

and after being stirred for 15 minutes, the mixture was filtered. The concentration of Pb++ in the filtrate was less than 0.1 p.p.m.

EXAMPLE 9

To 500 ml. of a waste water sample of pH 2.5 containing HgCl$_2$ (395 p.p.m. as Hg++) and CuCl$_2$ (80 p.p.m. as Cu++) was added 0.8 g. monosodium salt of 2,4,6-trimercapto-s-triazine hydrate

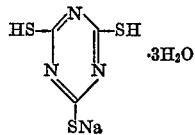

and after being stirred for 15 minutes, the mixture was filtered. Concentrations of Hg++ and Cu++ in the filtrate were respectively less than 1 p.p.b. and less than 0.03 p.p.m.

What we claim is:

1. In treating waste water containing at least one of metal ions having a normal electrode potential of at least —0.440 v. (at 25° C.) to remove the metal ion therefrom, a method which is characterized in that to the waste water is added at least one of mercapto-s-triazines and water-soluble salts thereof, said mercapto-s-triazine having a formula of

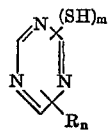

wherein R is hydrogen, —NH$_4$, —OH, alkyl having 1 to 8 carbon atoms, alkoxy having 1 to 8 carbon atoms, phenyl, cyclohexyl, oxazinyl, phenoxy, —NR'$_2$ or SR", R' being hydrogen, alkyl having 1 to 8 carbon atoms, phenyl, cyclohexyl, naphthyl or benzyl, R" being alkyl having 1 to 8 carbon atoms, phenyl, cyclohexyl, naphthyl or benzyl; $m$ is an integer of 1 to 3 and $n$ is 0 or an integer of 1 to 2.

2. The method according to claim 1, in which said mercapto-s-triazine is a monomercapto-s-triazine.

3. The method according to claim 1, in which said mercapto-s-triazine is a dimercapto-s-triazine.

4. The method according to claim 1, in which said mercapto-s-triazine is a trimercapto-s-triazine.

5. The method according to claim 1, in which said water-soluble salt of mercapto-s-triazine is an alkali metal salt of mercapto-s-triazine, ammonium salt of mercapto-s-triazine or alkaline earth metal salt of mercapto-s-triazine.

6. The method according to claim 1, in which said water-soluble salt of mercapto-s-triazine is added to waste water in an amount of 1 to 3 moles per valence of the metal ion to be removed.

References Cited

UNITED STATES PATENTS

| | | | |
|---|---|---|---|
| 3,428,636 | 2/1969 | Grigat et al. | 260—248 CS |
| 3,498,932 | 3/1970 | Dishburger et al. | 210—54 X |
| 3,544,569 | 12/1970 | Schwarze et al. | 260—248 CS |
| 3,669,936 | 6/1972 | Regenass et al. | 260—248 CS |
| 3,700,715 | 10/1972 | Berger | 210—54 X |

SAMIH N. ZAHARNA, Primary Examiner

T. G. WYSE, Assistant Examiner

U.S. Cl. X.R.

260—248 CS